Feb. 27, 1962 W. C. OBEREM 3,022,651

INTEGRAL OFFSET BEARING FOR LATCH OF KNITTING NEEDLE

Filed Feb. 26, 1958

W. C. Oberem
INVENTOR

BY Mason, Porter, Miller & Stewart
ATTORNEYS

United States Patent Office 3,022,651 Patented Feb. 27, 1962

3,022,651

INTEGRAL OFFSET BEARING FOR LATCH OF KNITTING NEEDLE

William C. Oberem, New Hartford, Conn., assignor to The Torrington Company, Torrington, Conn., a corporation of Maine Filed Feb. 26, 1958, Ser. No. 717,761
6 Claims. (Cl. 66—122)

The specification which follows relates to a novel integral offset bearing for the latch of a knitting needle.

The latch of a machine knitting needle is subject to considerable lateral stress. The bearing or fastening has a tendency to loosen. It may project beyond the side of the side walls of the needle. It is quite likely to permit the sides of the shank to separate far enough to permit the latch to slip off of the bearing. Any bearing which is formed of parts separate from the needle itself is open to numerous objections such as outlined above.

It has been discovered that a bearing can be made for the latch which will overcome the above disadvantages. Thus it will prevent dislodgment of the latch from the bearing regardless of the extent of wear or lateral displacement of the shank parts.

It is an object of my invention to produce an improved bearing that will hold despite lateral spreading of the shank of the needle.

A further object of the invention is to make a bearing which will have its parts integral with the shank of the needle.

A still further object of the invention is to provide a bearing in which the offset portion spans the full width of the latch itself.

For the purpose of illustrating the invention I have shown the preferred form on the following drawings in which.

Figure 1:
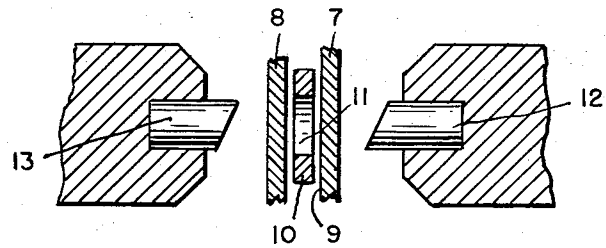
FIG. 1 is a schematic vertical section of the latch needle prepared for assembly.

Broadly stated, the novel bearing consists of portions of the shank of the needle, which portions are integral with the shank, but have offset members substantially spanning the width of the latch and coming within a very short distance from the opposite side of the shank.

As shown in the drawings the flat shank of the machine knitting needle has opposite side portions 7 and 8. These portions provide an intervening slot 9 to receive the latch proper.

The latch 10 fits within the slot 9 between the side walls 7 and 8 with sufficient clearance for easy movement but without likelihood of tilting out of the normal plane.

A latch hole 11 is provide to receive the improved bearing.

Figure 2:
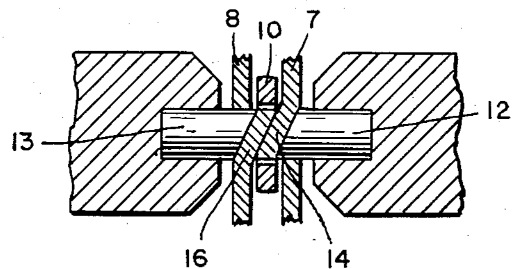
FIG. 2 is a similar section showing the final positions of the parts.
Figure 3:
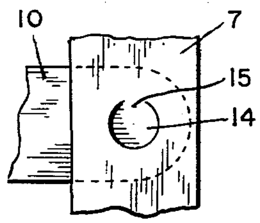
FIG. 3 is a side elevation of the bearing.

This bearing is made by offsetting portions of the side members 7 and 8. As shown in FIG. 1, the portions 7 and 8 are continuous and stand opposite the punches 12 and 13. The latter have inclined faces by means of which the material of the portions 7 and 8 can be partially sheared and bent so that the free ends will occupy the hole 11 of the latch 10. The extent of this punching and shearing operation is shown in FIG. 2. Here the side member 7 of the shank has been offset to provide a part circular tongue 14. It will be apparent that this tongue is integral with the portion 7 at the upper end as shown at 15 on FIG. 3.

The inclination of the face of the punch 12 is such that the free end of the tongue 14 is displaced to occupy practically the full distance between the inner faces of the members 7 and 8. It also underlies the full width of the latch 10.

The tongue 16 is bent in the opposite direction as shown in FIG. 2. Thus its root is integral with the side portion 8 for the full width at the bottom. The top part-circular free end is offset to underlie the entire width of the latch 10.

The tongues 14 and 16 are punched out in opposite directions so that their adjacent sides meet and are held under definite tension. At the same time the roots 15 merge into the outer faces of the portions 7 and 8 so that there is no recess formed at this point.

The edges of the tongues 14 and 16 form an efficient bearing on which the latch 10 may rock. In this operation the latch is entirely supported on each free end separately. The bearing is not dependent upon accurate registration between the free end and the adjacent portion of the opposite tongue.

One advantage of this construction is that the latch may rock out of its plane laterally but even so will not slip off the bearing provided by the free ends of the offset portions. In like manner since the free ends extend entirely across the hole 11, the latch cannot become separated from the bearing short of complete lateral displacement of the tongues. In other words, it would be necessary to displace the portions 7 and 8 an amount equal to twice the width of the latch before the latter can be disengaged from the free ends of the offset portions 14 and 16. This adds greatly to the life of the needle since there is normal wear to the sides of the latch and the sides of the groove. The fact that it is going to take twice the amount of spread in the groove to get a fallen-out latch, insures a greatly extended life.

While the preferred form has been illustrated by way of example, the invention is limited solely by the scope of the appended claims.

What I claim is:

1. A needle having spaced parallel shank portions, a latch therefor having a bearing hole, and a bearing comprising angular overlapping tongues partially sheared and bent inwardly from each shank portion, each tongue having a free end extending across the hole of the latch and a root integral with the shank portion and coextensive with the latter's width.

2. A needle having spaced parallel shank portions, a latch therefor having a bearing hole, and a bearing comprising angular overlapping tongues partially sheared and bent inwardly from each shank portion, each tongue having a free end extending entirely across the hole of the latch and a root integral with the shank portion over the full width of the latter and being flush with its outer surface.

3. A needle having spaced parallel shank portions, a latch therefor having a bearing hole, and a bearing comprising overlapping tongues partially sheared and bent inwardly from each shank portion, each tongue having a free end extending across the hole of the latch to a point adjacent the opposite shank portion and each tongue having a root integral with the shank portion over the full width of the latter.

4. A needle having spaced parallel shank portions, a latch therefor having a bearing hole, and a bearing comprising overlapping tongues partially sheared and bent inwardly from each shank portion, each tongue having a root integral with the shank portion and coextensive with the latter's width, and a part-circular free end extending across the hole of the latch to a point adjacent the root of the opposite tongue.

5. A needle having spaced parallel shank portions, a latch therefor having a bearing hole, and a bearing comprising angular overlapping tongues partially sheared and bent inwardly from each shank portion, each tongue having a root integral with the shank portion and coextensive with the latter's width and a part-circular free end extending across the hole of the latch to a point adjacent the root of the opposite tongue, each tongue having a part circular full length bearing for the hole in the latch.

6. A needle having spaced parallel shank portions, a latch therefor having a bearing hole, and a bearing comprising angular overlapping tongues partially sheared and bent inwardly from each shank portion, each tongue having a root integral with the shank portion and coextensive with the latter's width, and a part-circular free end extending across the hole of the latch to a point adjacent the root of the opposite tongue, each tongue making a part circular full length bearing for the full width of the hole in the latch.

References Cited in the file of this patent

UNITED STATES PATENTS

| | | |
|---|---|---|
| 1,961,429 | Perret | June 5, 1934 |
| 1,991,140 | Currier | Feb. 12, 1935 |
| 2,859,815 | Smith | Nov. 11, 1958 |